United States Patent
Snider

(10) Patent No.: US 10,733,928 B1
(45) Date of Patent: Aug. 4, 2020

(54) ELECTROCHROMIC FILM COLORED FILTER ENHANCER FOR A USER INTERFACE DISPLAY

(71) Applicant: Schlage Lock Company LLC, Carmel, IN (US)

(72) Inventor: Chris R. Snider, Noblesville, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

(21) Appl. No.: 16/275,830

(22) Filed: Feb. 14, 2019

(51) Int. Cl.
G09G 3/20 (2006.01)
G09G 3/3208 (2016.01)
G02F 1/163 (2006.01)

(52) U.S. Cl.
CPC ........... *G09G 3/2003* (2013.01); *G02F 1/163* (2013.01); *G09G 3/3208* (2013.01); *G09G 2320/0666* (2013.01); *G09G 2354/00* (2013.01)

(58) Field of Classification Search
CPC .................................................. G09G 3/2003
USPC ........................................................ 345/589
See application file for complete search history.

(56) References Cited

U.S. PATENT DOCUMENTS

| 2016/0299596 A1* | 10/2016 | den Boer | C03C 17/3671 |
| 2017/0081877 A1* | 3/2017 | Ng | G07C 9/00 |
| 2019/0049809 A1* | 2/2019 | Oyama | G02F 1/157 |

* cited by examiner

*Primary Examiner* — Shivang I Patel
(74) *Attorney, Agent, or Firm* — Taft Stettinius & Hollister LLP

(57) ABSTRACT

A user interface display system that is associated with an electronic lock that provides feedback to a user that is engaging the electronic lock. A user interface display system includes a user interface display to depict to the user feedback patterns with each feedback pattern that is displayed to the user providing the feedback to the user. An electrochromic filter transitions a color depicted by the user interface display to correspond to the feedback pattern depicted by the user interface display. Each feedback pattern that is displayed provides a corresponding color that is associated with the feedback that is provided to the user as the user engages the electronic lock. A controller transitions the electrochromic filter to each color to correspond with the feedback pattern that is displayed by the user interface display so that the transitioned color and the feedback pattern that is displayed is in response to the user engaging the electronic lock.

20 Claims, 9 Drawing Sheets

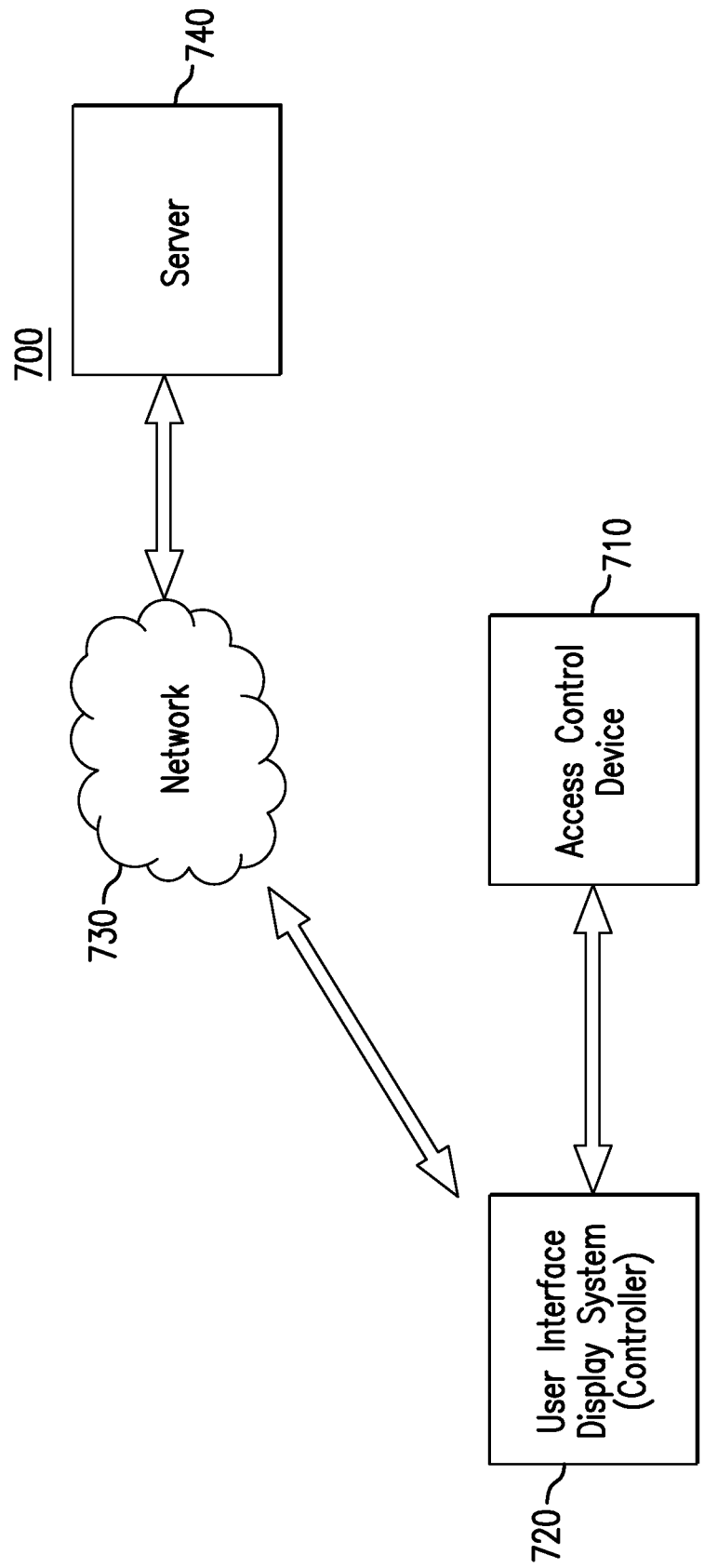

US 10,733,928 B1

ELECTROCHROMIC FILM COLORED FILTER ENHANCER FOR A USER INTERFACE DISPLAY

BACKGROUND

Field of Disclosure

The present disclosure generally relates to user interface displays and specifically to an electrochromic colored filter enhancer for user interface displays.

Related Art

Conventional user interface displays typically include light emitting diodes (LEDs) that are positioned in the conventional user interface display to provide feedback to the user as the user engages the conventional user interface display. With the advent of screen printed on film organic LEDs (OLEDs), the OLEDs are arranged in a conventional dot matrix pattern such that the necessary OLEDs emit light to provide the appropriate pattern to be displayed to provide feedback to the user. Typically, OLEDs are screen printed as monochromatic to decrease the cost in screen printing the OLEDs. The color of feedback displayed to the user is limited to the monochromatic color of the OLEDs and/or the filter positioned on the monochromatic OLEDs limiting the display of that filter to a single color. Thus, the flexibility of the feedback emitted by the monochromatic OLEDs is significantly limited for the conventional user interface display.

BRIEF SUMMARY

Embodiments of the present disclosure relate to incorporating an electrochromic filter into a user interface display system to transition the colors displayed by the user interface display system as the user interface display system provides feedback to the user. In an embodiment, a user interface display system is associated with an electronic lock that provides feedback to a user that is engaging the electronic lock. The user interface display system includes a user interface display that is configured to depict to the user a plurality of feedback patterns with each feedback pattern that is displayed is in response to the user engaging the electronic lock. Each feedback pattern that is displayed to the user provides the feedback to the user as the user engages the electronic lock. An electrochromic filter is configured to transition a color depicted by the user interface display to correspond to the feedback pattern depicted by the user interface display. Each feedback pattern that is displayed to the user provides a corresponding color that is associated with the feedback that is provided to the user as the user engages the electronic lock. A controller is configured to transition the electrochromic filter to each color to correspond with the feedback pattern that is depicted by the user interface display so that the transitioned color and the feedback pattern that is displayed is in response to the user engaging the electronic lock.

In an embodiment, a method provides feedback to a user that is engaging an electronic lock. A plurality of feedback patterns is depicted to the user via a user interface display with each feedback pattern that is displayed in response to the user engaging the electronic lock. Each feedback pattern that is displayed to the user provides the feedback to the user as the user engages the electronic lock. A color depicted by the user interface display is transitioned via an electrochromic filter to correspond to the feedback patter depicted by the user interface display. Each feedback pattern that is displayed to the user provides a corresponding color that is associated with the feedback that is provided to the user as the user engages the electronic lock. The electrochromic filter is transitioned to each color via a controller to correspond with the feedback pattern that is displayed by the user interface display so that the transitioned color and the feedback pattern that is displayed is in response to the user engaging the electronic lock.

In an embodiment, a user interface display system provides feedback to a user that is engaging the user interface display system. A user interface display is configured to depict to the user a plurality of feedback patterns with each feedback pattern that is displayed is in response to the user engaging the user interface display system. Each feedback pattern that is displayed to the user provides the feedback to the user as the user engages the user interface display system. A light source is configured to emit a plurality of light patterns via the user interface display to the user with each light pattern corresponding to each feedback pattern that is displayed in response to the user engaging the user interface display system. An electrochromic filter is configured to transition a color of the feedback pattern displayed by the user interface display to correspond to the light pattern emitted by the light source. Each feedback pattern that is displayed to the user provides a corresponding color that is associated with the feedback that is provided to the user as the user engages the electronic lock. A controller is configured to instruct the light source to emit each light pattern via the user interface display to the user that corresponds to each feedback pattern that is displayed in response to the user engaging the user interface display system. The controller is also configured to transition the electrochromic filter to each color to correspond with the light pattern that is emitted by the light source so that the transitioned color and the emitted light pattern that is displayed is in response to the user engaging the user interface display system.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

Figure 5:
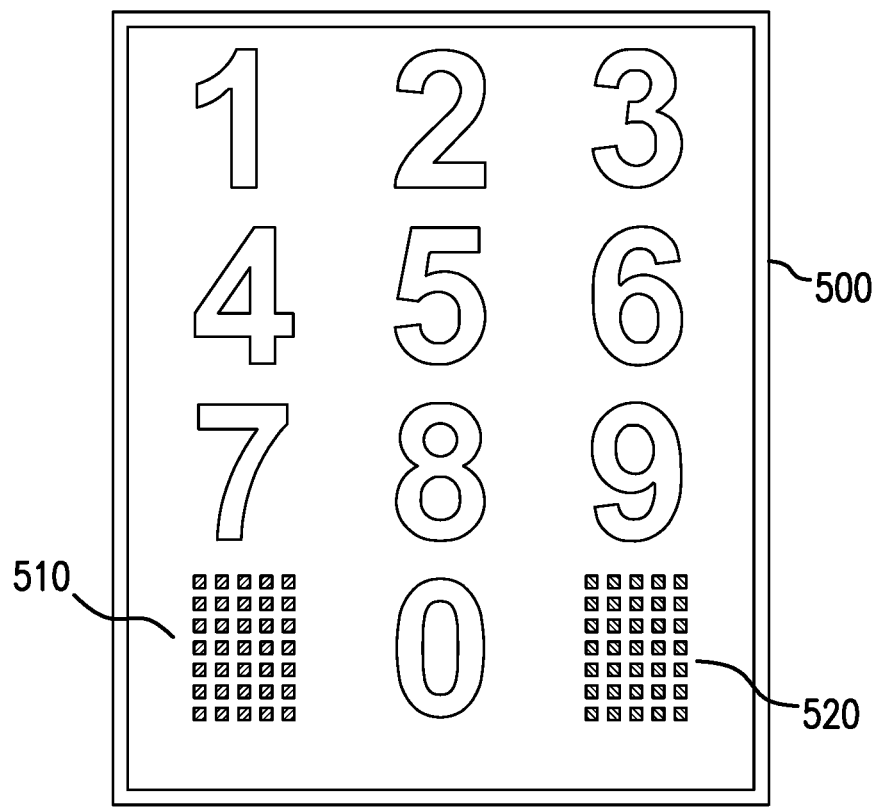
Figure 6A:
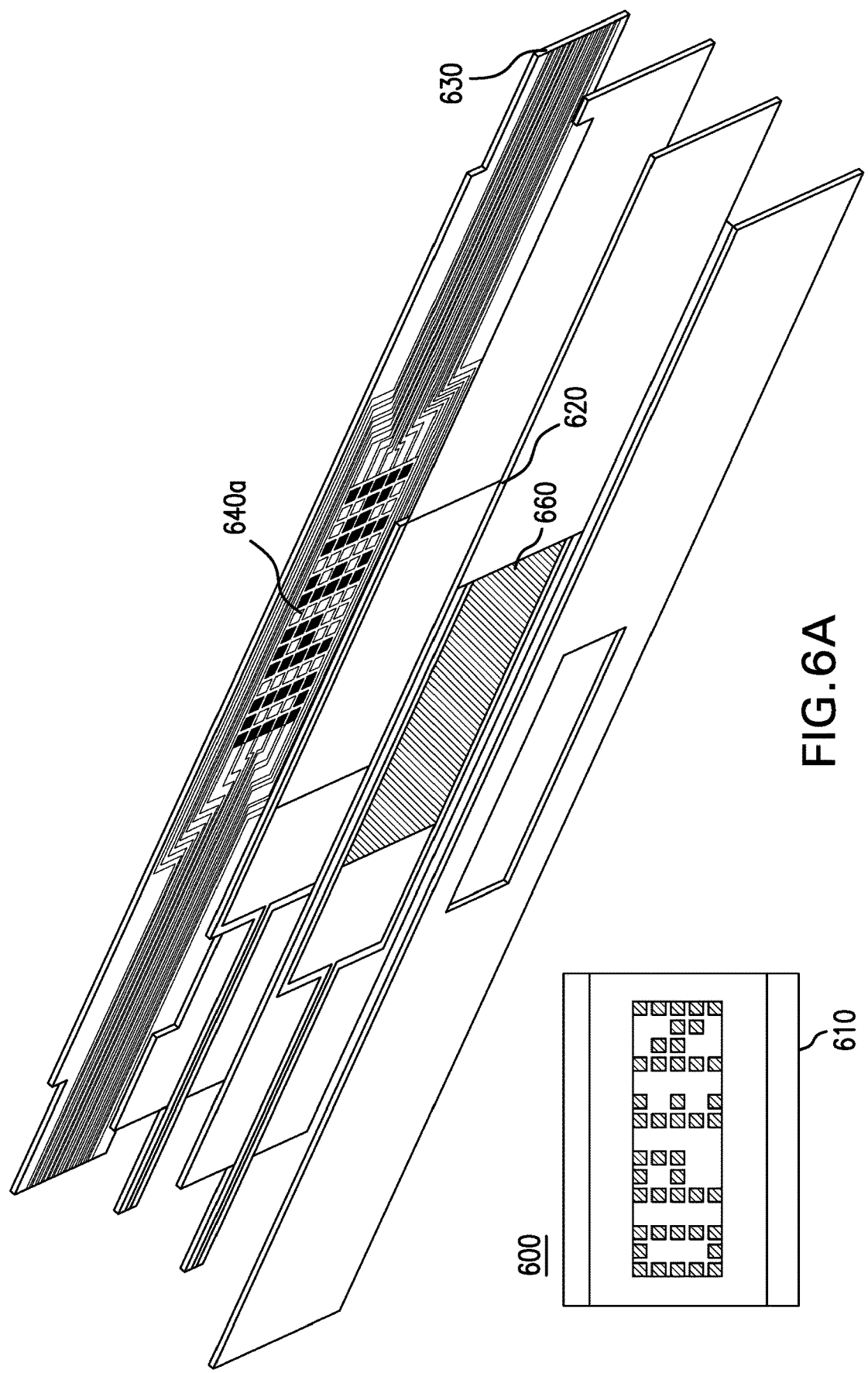
Figure 6B:
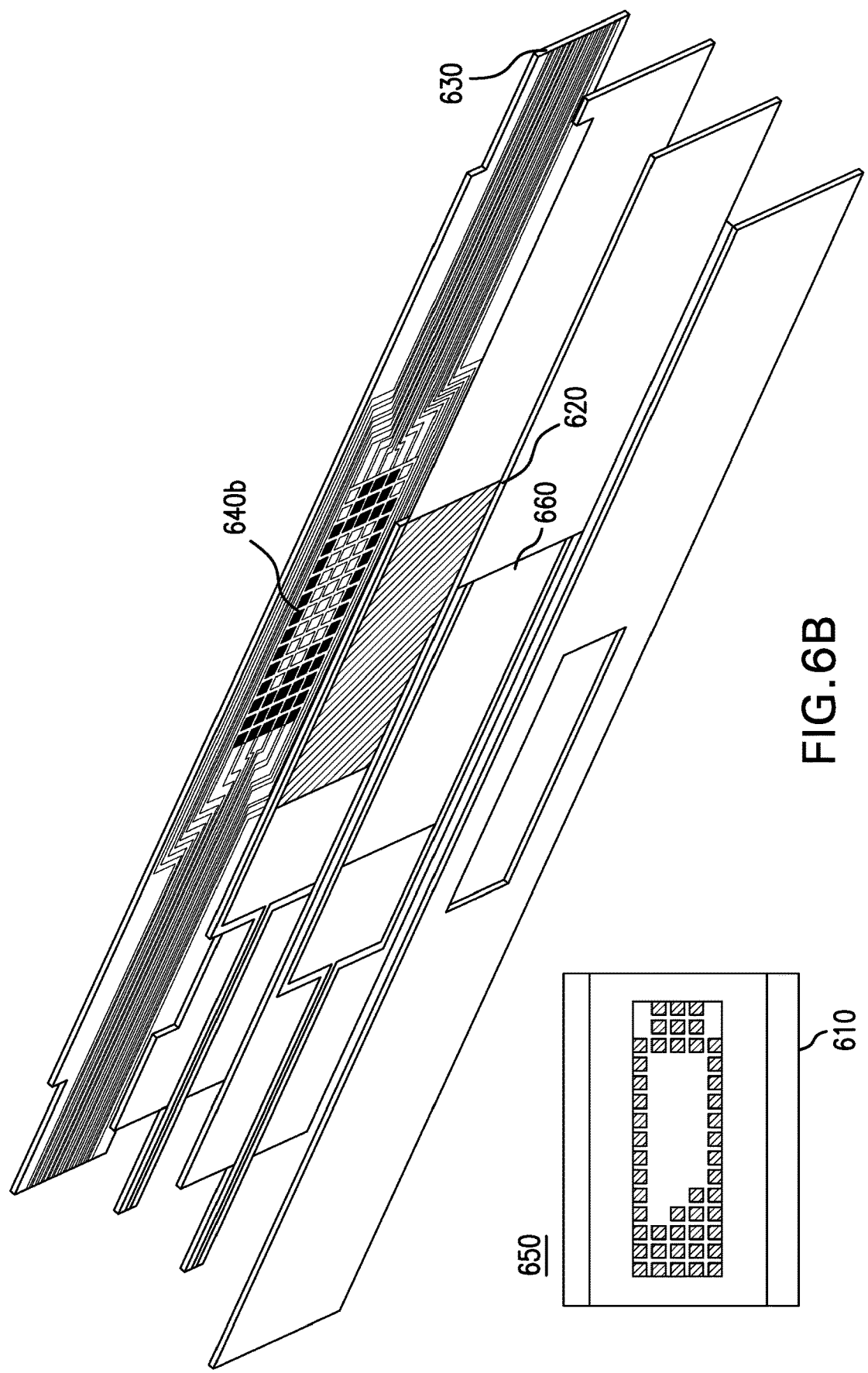
Figure 8:
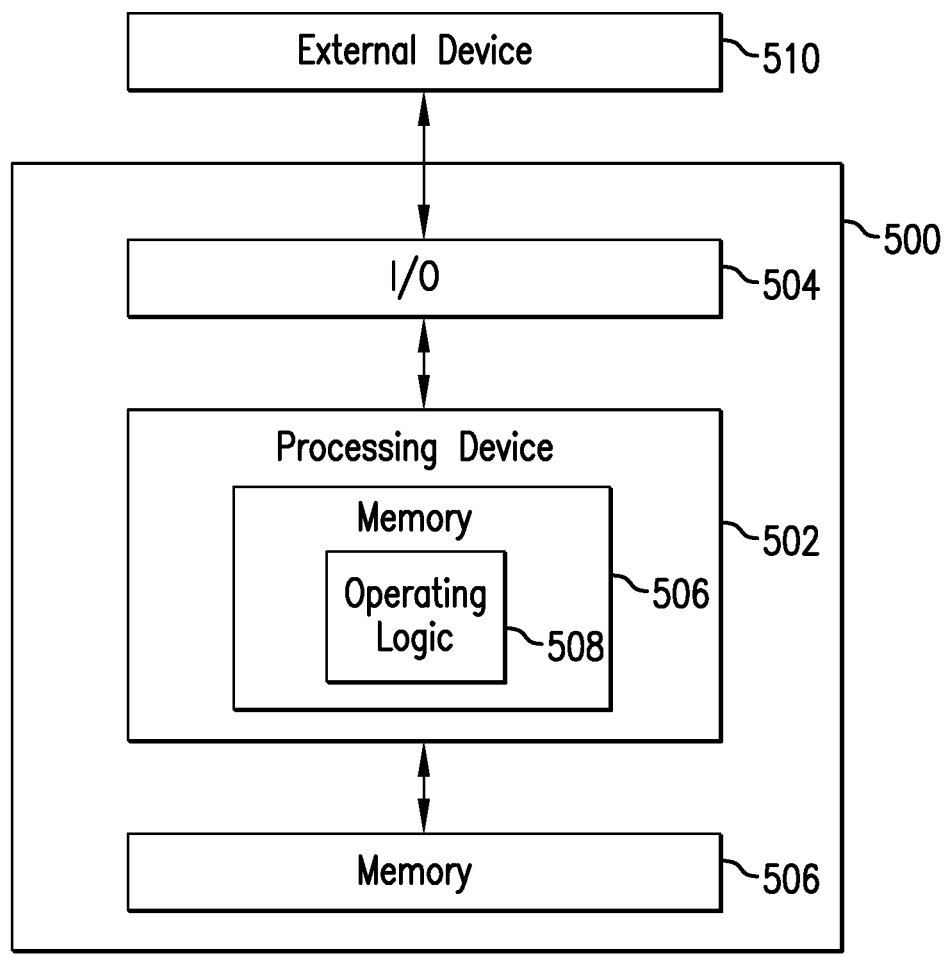

FIG. 5 depicts an elevational view of an example electronic lock that includes a first user interface display that emits feedback patterns with a corresponding color based on a first electrochromic filter that is associated with the first user interface display and a second user interface display that emits feedback patterns with a corresponding color based on a second electrochromic filter that is associated with the second user interface display;

FIG. 6A depicts an elevational view of an example user interface display system that is associated with an electronic lock that emits feedback patterns with a corresponding color based on a first electrochromic filter and a second electrochromic filter that is associated with a single user interface display that emits feedback patterns with a corresponding color based on the first electrochromic filter and the second electrochromic filter;

FIG. 6B depicts an elevational view of an example user interface display system that is associated with an electronic lock that emits feedback patterns with a corresponding color based on a first electrochromic filter and a second electrochromic filter that is associated with a single user interface display that emits feedback patterns with a corresponding color based on the first electrochromic filter and the second electrochromic filter;

FIG. 7 is a block diagram of an exemplary access control device configuration that incorporates the user interface display systems discussed in detail above; and FIG. 8 is a block diagram of at least one embodiment of a computing device.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

Electrochromic Visual Feedback Display System

Figure 1:
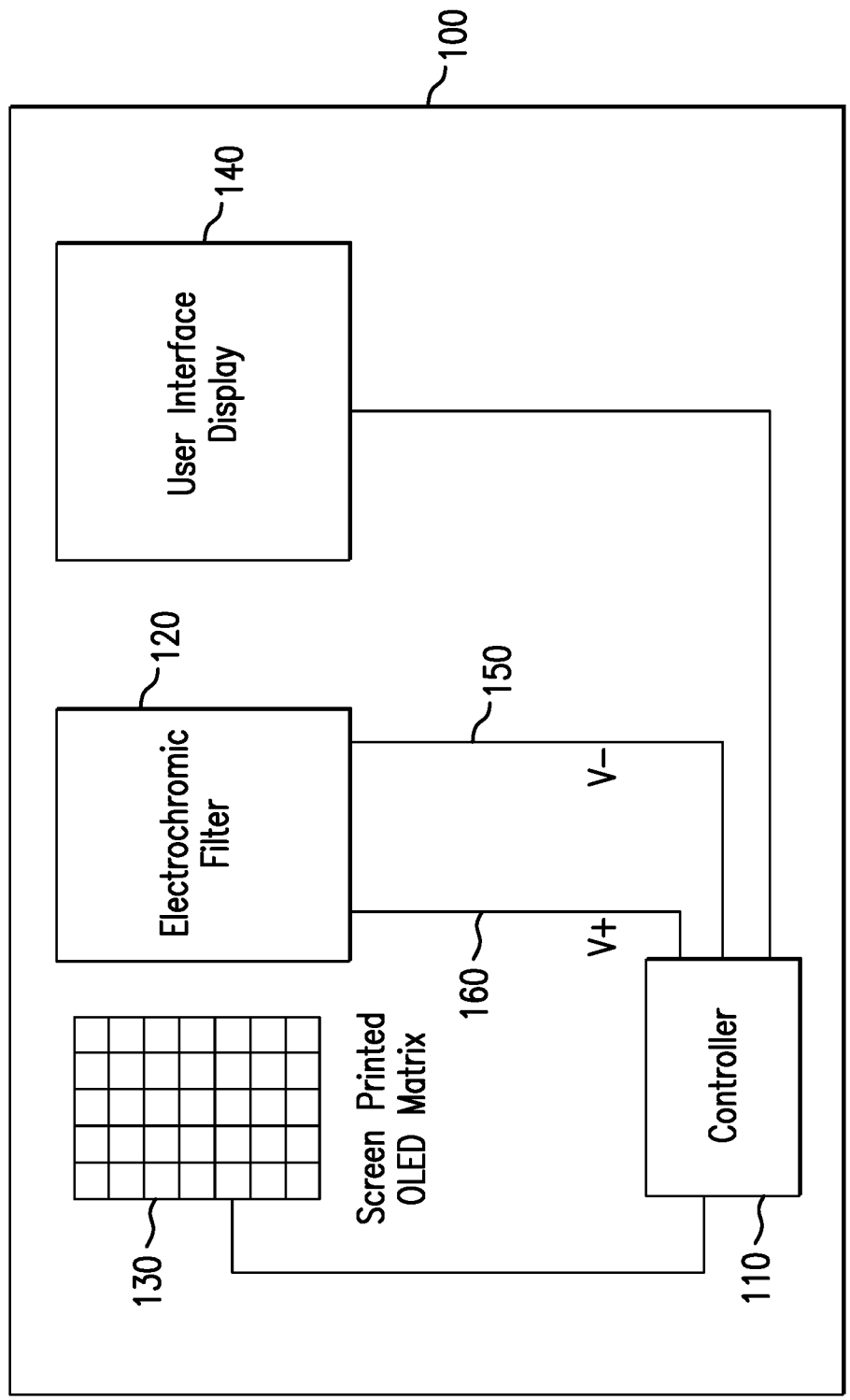
FIG. 1 is a block diagram of a visual feedback display system that displays visual feedback to a user as the user engages the visual feedback display system.

FIG. 1 is a block diagram of a visual feedback display system 100 that displays visual feedback to a user as the user engages the visual feedback display system 100. For example, the visual feedback display system 100 may be associated with an access control device that enables the user to receive feedback as the user engages the access control device in an attempt to obtain access to the space that is regulated by the access control device. The visual feedback display system 100 includes a user interface display 140, an electrochromic filter 120, a light source 130, and a controller 110.

The visual feedback display system 100 may be associated with a system that provides visual feedback to the user as the user engages the system. As the user engages the system, the visual feedback display system 100 may provide feedback to the user such that the user may have a better understanding of the status of the user in engaging the system. For example, the visual feedback display system 100 may be associated with an access control system that regulates the access that the user may have to a space. The user may engage the access control system in an attempt to gain access to the space that is regulated by the access control system. The feedback displayed by the visual feedback display system 100 may then provide the user with information that enables the user to have a better understanding of the status of the user engaging the visual feedback display system. For example, the visual feedback display system 100 when associated with the access control system may provide feedback to the user to enable the user to have a better understanding if the user is adequately engaging the access control system to gain access to the space that the access control system is regulating.

The visual feedback display system 100 may provide feedback to the user that is attempting to engage a system that includes but is not limited to access control systems that include but are not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control system that regulates access control to a space that will be apparent to those skilled in the relevant art(s) without departing from the spirit and scope of the disclosure. Further, visual feedback display system 100 may provide feedback to the user that is attempting to engage any type of system where that engagement by the user with the system provides feedback to the user that is associated with the status of the user in engaging the system that may provide the user with a better understanding of the status of the user in engaging the system that will be apparent to those skilled in the relevant art(s) without departing from the spirit and scope of the disclosure.

The visual feedback display system 100 may include the user interface display 140 that depicts to the user a plurality of feedback patterns with each feedback pattern that is displayed is in response to the user engaging the system. Each feedback pattern that is displayed to the user provides the feedback to the user as the user engages the system. As the user engages the system associated with the visual feedback display system 100, the user interface display 140 of the visual feedback display system 100 may depict feedback patterns to the user that correspond to the current status of the user in engaging the system associated with the visual feedback display system 100 thereby enabling the user to have feedback with regard to the current status of the user in engaging the system.

Figure 2:
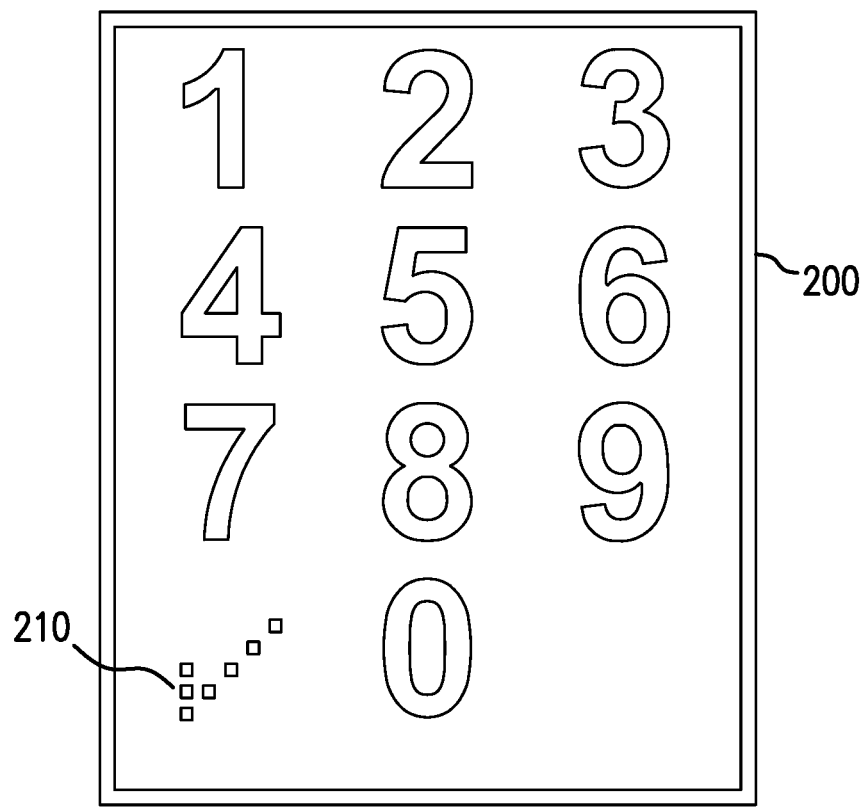
FIG. 2 depicts an elevational view of an example electronic lock that includes a user interface display.

For example, FIG. 2 depicts an elevational view of an example electronic lock 200 that includes a user interface display 210. As the user engages the electronic lock 200, the user interface display 210 may depict to the user different feedback patterns with each feedback pattern that is displayed is in response to the user engaging the electronic lock 200 such that each feedback pattern provides different information to the user regarding the status of the engagement of the electronic lock 200 by the user. In such an example, the user interface display 210 displays the feedback pattern of a "green check mark" to the user indicating to the user that the user has adequately entered the appropriate access code into the electronic lock 200 and that the electronic lock 200 is transitioning into an unlocked state to enable the user to have access to the space regulated by the electronic lock 200. The feedback pattern displayed by the user interface display 140 may be any type of feedback pattern that provides information to the user as to the status of the user engaging the system associated with the user interface display system 100 that will be apparent to those skilled in the relevant art(s) without departing from the spirit and scope of the disclosure.

The user interface display 140 may include any type of display device include but not limited to a touch screen display, a liquid crystal display (LCD) screen, a dot matrix display, an Organic Light Emitting Diode (OLED) display, screen printed OLED matrix display and/or any other type of display device that includes a display that will be apparent from those skilled in the relevant art(s) without departing from the spirit and scope of the present disclosure.

The user interface display system 100 may include a light source 130 that is configured to emit a plurality of light patterns via the user interface display 140 to the user with each light pattern corresponding to each feedback pattern that is displayed in response to the user engaging the system associated with the user interface display system 100. As noted above, as the user engages the user interface display system 100, the user interface display 140 may emit feedback patterns that provide feedback to the user as to the current status of the user in engaging the system associated with the user interface display system 100. For each feedback pattern that is emitted by the user interface display 140, the light source 130 may generate a light pattern that corresponds to the feedback that is to be provided to the user in order to generate the feedback pattern emitted by the user interface display 140 thereby enabling the user to have feedback with regard to the current status of the user in engaging the system. In doing so, the controller 110 may instruct the light source 130 to emit each light pattern via the user interface display 140 to the user that corresponds to each feedback pattern that is displayed in response to the user engaging the system associated with the user interface display system 100.

Figure 3A:
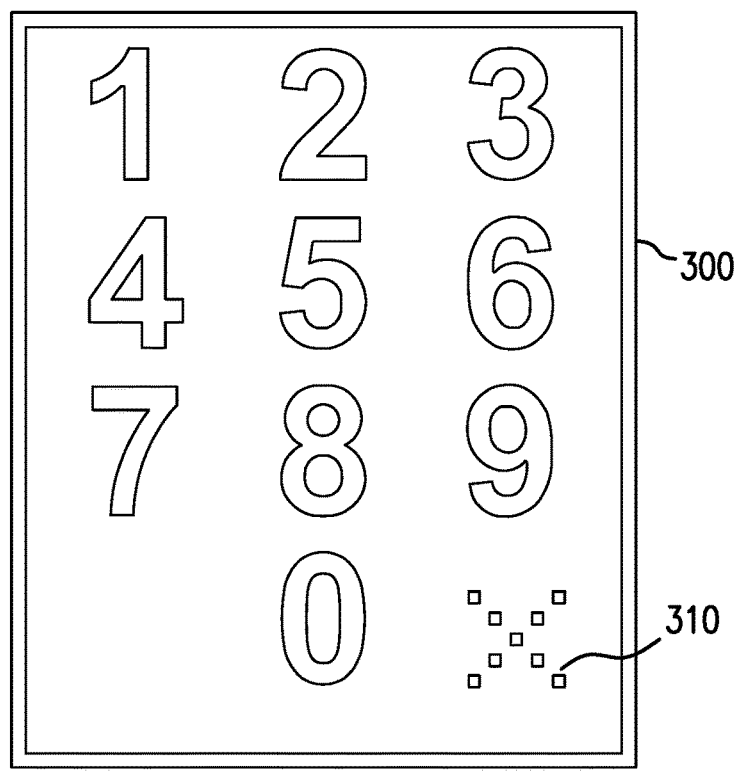
FIG. 3A depicts an elevational view of an example electronic lock that includes a user interface display that emits feedback patterns with a corresponding color based on the electrochromic filter that is associated with the user interface display.

For example, FIG. 3A depicts an elevational view of an example electronic lock 300 that includes a user interface display 310 that emits feedback patterns with a corresponding color based on the electrochromic filter 120 that is associated with the user interface display 310. As the user engages the electronic lock 300, the user interface display 310 may depict to the user different feedback patterns with each feedback pattern that is displayed is in response to the user engaging the electronic lock 300 such that each feedback pattern provides different information to the user regarding the status of engagement of the electronic lock 300 by the user. In doing so, the controller 110 may instruct the light source 130 that is associated with the user interface display 310 to emit different light patterns with each light pattern corresponding to a different feedback pattern that is displayed by the user interface display 310 to the user in response to the user engaging the electronic lock 300.

In such an example, the user enters the incorrect access code into the electronic lock 300. In response to the entering of the incorrect access code, the controller 110 instructs the light source 130 that is associated with the user interface display 310 to emit a light pattern that depicts the "red X". The user interface display 310 then displays the feedback pattern of the "red X" to the user indicating to the user that the user has failed to enter the appropriate access code to the electronic lock 300 and that the electronic lock is remaining in a locked state to prevent the user from having access to the space regulated by the electronic lock. The light pattern emitted by the light source 130 as instructed by the controller 110 and displayed by the user interface display 140 may be any type of feedback pattern that provides information to the user as to the status of the user engaging the system associated with the user interface display system 100 that will be apparent to those skilled in the relevant art(s) without departing from the spirit and scope of the disclosure.

The light source 130 may include any type of lighting configuration and not limited to a light emitting diode (LED) configuration, OLED configuration, dot matrix lighting configuration, an LCD lighting configuration, a screen printed OLED matrix configuration, and/or any other type of lighting configuration that includes a light source that will be apparent from those skilled in the relevant art(s) without departing from the spirit and scope of the present disclosure.

The electrochromic filter 120 may transition a color depicted by the user interface display 140 to correspond to the feedback pattern depicted by the user interface display 140. Each feedback pattern that is displayed to the user provides a corresponding color that is associated with the feedback that is provided to the user as the user engages the system associated with the user interface display system 100. The controller 110 may transition the electrochromic filter 120 to each color to correspond with the feedback pattern that is depicted by the user interface display 140 so that the transitioned color and the feedback pattern that is displayed is in response to the user engaging the system associated with the user interface display system 100. The controller 110 may control the optical properties of the electrochromic filter 120, such as but not limited to the optical transmission, absorption, reflectance, and/or emittance, in a continuous manner based on a voltage applied to the electrochromic filter 120 to transition the color of the electrochromic filter 120. In doing so, the optical properties of the electrochromic filter 120 may also be reversed to transition the color of the electrochromic filter 120 back to the original color when the controller 110 applies a different voltage to the electrochromic filter 120.

The electrochromic filer 120 may provide the user interface display system 100 with the flexibility to emit different colors associated with each feedback pattern. Rather than the user interface display 140 emit each different feedback pattern to the user in a single color, the electrochromic filter 120 may enable the user interface display system 100 to display each different feedback pattern in a color that corresponds to the feedback pattern to further enhance providing feedback to the user regarding the current status of the user in engaging the system associated with the user interface display system 100. For example, returning to FIG. 2, the user may adequately enter the correct access code into the electronic lock 200 such that the electronic lock 200 transitions to the unlocked state to enable the user to gain access to the space regulated by the electronic lock 200. In doing so, the controller 110 may instruct the light source 120 to emit a light pattern that corresponds to a feedback pattern of a "check mark". Rather than simply displaying the light pattern in a monochromatic color such as "white", the controller 110 may instruct the electrochromic filter 120 to transition to the color "green" thereby providing additional feedback to the user in that the color "green" is typically associated with by the user as being "correct" and/or "authorized". Thus, the additional feedback of the color "green" further provides information to the user in addition to the feedback pattern of the "check mark" that the user has adequately entered the correct access code and that the electronic lock 200 has transitioned to the unlocked state thereby enabling the user to have access to the space regulated by the electronic lock 200.

In an embodiment, the user interface display system 100 may incorporate a screen printed OLED matrix display such that the light source 130 incorporates a screen printed OLED matrix configuration that then emits the light pattern via the user interface display 140 that incorporates the screen printed OLED matrix display. In doing so, the power consumed by the user interface display system 100 to emit each light pattern to correspond to each feedback pattern displayed by the user interface display 140 to the user may be decreased as compared to other conventional light sources such as dot matrix LED light configurations. Further, the overall thickness of the user interface display system 100 that incorporates the screen printed OLED matrix display may also be decreased as compared to other conventional light sources such as dot matrix LED light configurations due to the OLED matrix light source being screen printed to generate the screen printed OLED matrix display.

However, conventional user interface display systems that incorporate the screen printed OLED matrix display may be limited to emitting a single color with regard to the screen printed OLED matrix display. Typically, the screen printed OLED matrix display is limited to a single color such that once the OLED matrix light source is screen printed onto the conventional display system, such a screen printed OLED matrix display is limited to then emitting a single color for each feedback pattern that is displayed by the user interface display associated with the screen printed OLED matrix display. For example, a conventional user interface display that incorporates a screen printed OLED matrix light source that is a "white" color is then limited to displaying each feedback pattern in a "white" color. In such an example, such a conventional user interface display is limited to displaying both a feedback pattern of a "check mark" and a feedback pattern of a "X" in the single monochromatic color of "white" thereby limiting the feedback to the user.

Further in such an example, the conventional user interface display that then incorporates a screen printed OLED matrix light source that is a "green" color is then limited to displaying only feedback patterns where the user may easily correspond the "green" color with feedback that the user typically associates with as being "green". In doing so, the conventional user interface display is limited to displaying feedback patterns that are "affirmative" in nature such as the "check mark" that the user may easily associate with the "green" color. The user may become easily confused should the conventional user interface display then display the feedback pattern of the "X" in the "green" color as typically the user associates the feedback pattern of the "X" as "negative" in nature which conflicts with the "green" color which is typically associated by the user as being "affirmative" in nature. Thus, the conventional user interface display is limited in the feedback patterns that may be displayed via the conventional user interface display based on the color of the screen printed OLED matrix light source that is associated with the conventional user interface display.

In order for the conventional user interface display to have an increase in flexibility in the color that the conventional user interface display emits, the conventional user interface display is required to incorporate a dot matrix LED light source that includes multi-color LEDs. Each multi-color LED may emit a different color when instructed based on the feedback pattern that is to be emitted by the conventional user interface display. For example, the multi-color LEDs may transition between the color "green" when the conventional user interface display emits the "check mark" and then transition to emitting the color "red" when the conventional user interface display emits the "X". However, such multi-color LEDs consume significantly more power than the screen printed LED matrix light source as well as significantly increase the thickness of the conventional user interface display system. As a result, for many applications, that are battery operated and require a stringent physical footprint, such as an access control system, incorporating a multi-color LED dot matrix light source to provide the flexibility in emitting different colors to correspond to different feedback patterns is not feasible.

Thus, the electrochromic filter 120 may transition the color of the feedback pattern that is displayed by the user interface display 140 to correspond to the light pattern emitted by the light source 130 thereby providing the user interface display 140 with the flexibility to emit feedback patterns with a color that corresponds to the feedback pattern. The controller 110 may transition the electrochromic filter 120 to each color to correspond with the light pattern that is emitted by the light source 130 so that the transitioned color and the emitted light pattern that is displayed is in response to the user engaging the system associated with the user interface display system 100. For example, in FIG. 3A, the controller 110 may instruct the electrochromic filter 120 to transition into different colors to correspond to the different feedback pattern that is displayed by the user interface display 310 to the user in response to the user engaging the electronic lock 300. In such an example, the controller 110 instructs the electrochromic filter 120 that is associated with the user interface display 310 to transition to the color "red" such that the user interface display 310 displays the feedback pattern of the "red X" to the user indicating that the user has failed to enter the appropriate access code to the electronic lock 300 and that the electronic lock 300 is remaining in a locked state to prevent the user from having access to the space regulated by the electronic lock 300.

Figure 3B:
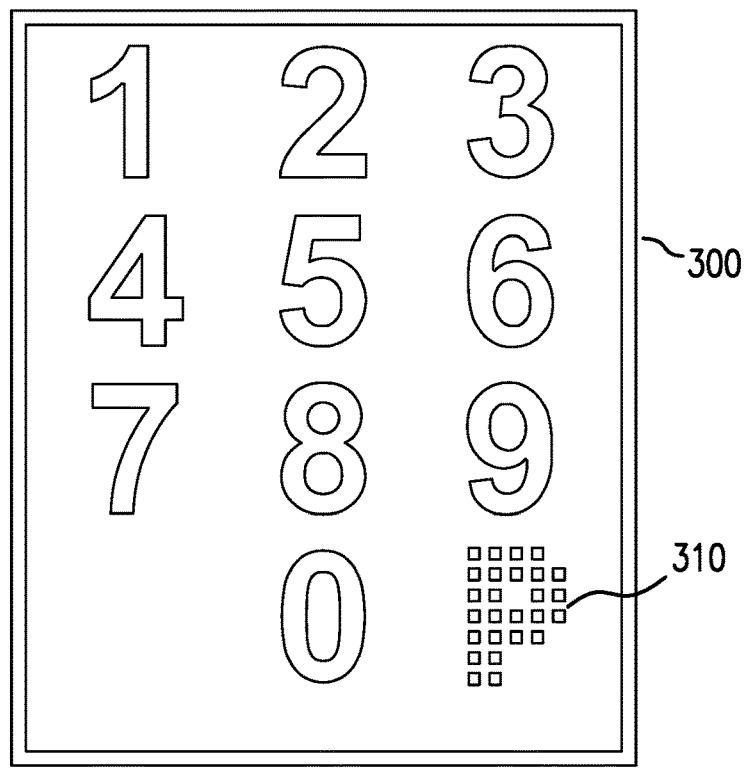
FIG. 3B depicts an elevational view of the example electronic lock that includes the user interface display that emits a different feedback pattern as well with a different color from FIG. 3A based on the electrochromic filter that is associated with the user interface display.

However, FIG. 3B depicts an elevational view of the example electronic lock 300 that includes the user interface display 310 that emits a different feedback pattern as well with a different color from FIG. 3A based on the electrochromic filter that is associated with the user interface display 310. In such an example, the user is attempting to program the electronic lock 300 thereby triggering a different feedback pattern to be emitted by the user interface display 310 to provide feedback to the user that corresponds to the current status of the user engaging the electronic lock 300 which is the user programming the electronic lock 300. In doing so, the controller 110 instructs the light source 130 to transition from emitting the light pattern of the "X" to the light pattern of the "P" to provide to the user the feedback that the user is adequately engaging the electronic lock 300 to program the electronic lock 300. The controller 110 also instructs the electrochromic filter 120 to transition from the color "red" to the color "white" so that the color "white" corresponds with the light pattern of the "P" to adequately provide feedback to the user that the user is adequately engaging the electronic lock 300 to program the electronic lock 300. Thus, the electrochromic filter 120 transitioning between the color "red" to correspond to the feedback pattern of "X" and the color "white" to correspond to the feedback pattern of "P" enables the user interface display 310 to adequately display both the feedback pattern of "X" and the feedback pattern of "P" to the user with the appropriate colors to correspond to those feedback patterns.

In doing so, the user interface display system 100 includes the flexibility to have different feedback patterns emitted by the user interface display 140 with the appropriate corresponding color to provide the appropriate feedback to the user without being limited to the user interface display 140 emitting a single feedback pattern that corresponds with a single color. For systems associated with the user interface display system 100 that may be battery operated, such as an access control system, user interface display system 100 may provide the flexibility with emitting different feedback patterns via the user interface display 140 that correspond to different colors provided by the electrochromic filter 120 while still incorporating the light source 130 as a screen printed OLED matrix. In doing so such systems that require decreased power consumption as well as a decreased physical footprint, such as the access control system, may have an increased flexibility in the feedback patterns displayed to the user as well as an increased flexibility in the colors associated with the feedback patterns while maintaining decreased power consumption and a decreased physical footprint.

Electrochromic Filter

Figure 4A:
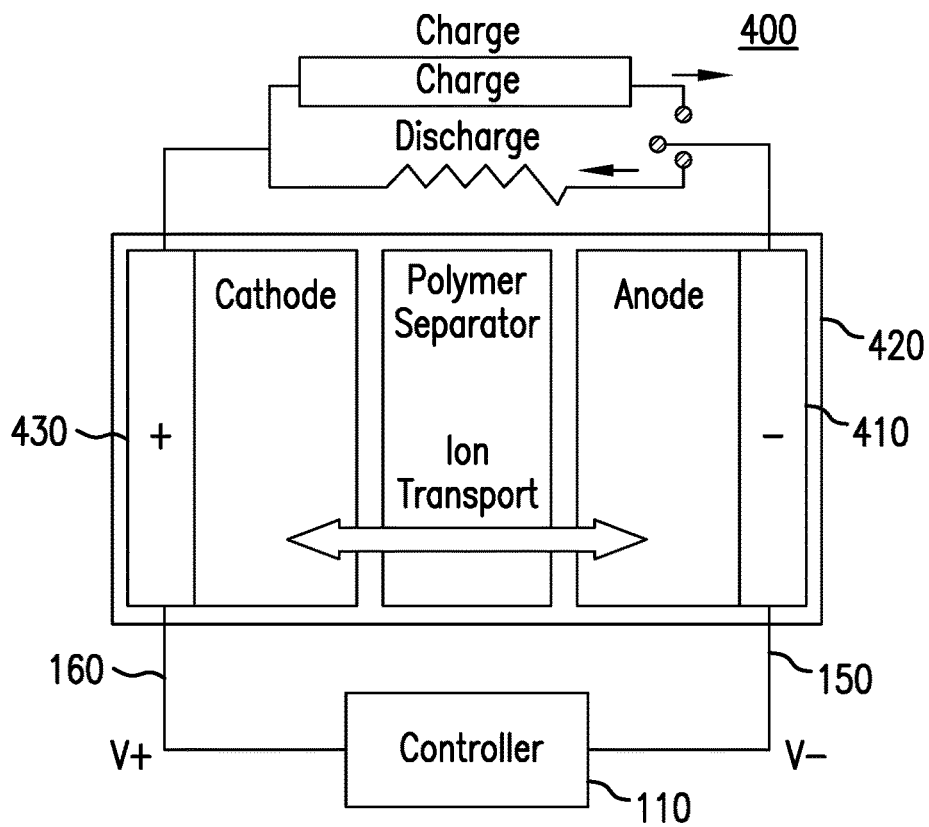
FIG. 4A is a schematic view of an electrochromic filter configuration that is associated with a user interface display system.
Figure 4B:
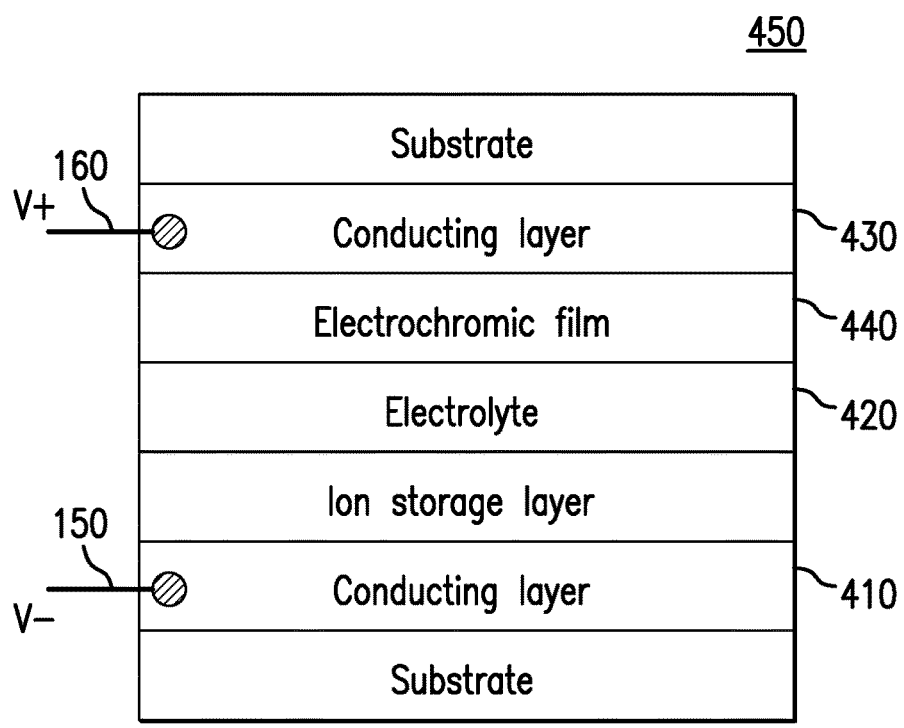
FIG. 4B is a schematic view of an electrochromic filter configuration that depicts a layering view of the electrochromic filter depicted in FIG. 4A.

FIG. 4A is a schematic view of an electrochromic filter configuration 400 that is associated with a user interface display system. The electrochromic filter configuration 400 transitions between colors as instructed by the controller 110 based on a negative voltage 150 that is applied to the electrochromic filter 420 by the controller 110 and a positive voltage 160 that is applied to the electrochromic filter 420. The electrochromic filter configuration 400 includes the controller 110, an electrochromic filter 420, a negative conducting layer 410, and a positive conducting layer 430. FIG. 4B is also a schematic view of an electrochromic filter configuration 450 that depicts a layering view of the electrochromic filter 420 depicted in FIG. 4A. The electrochromic filter configuration 450 includes the negative conducting layer 410 that the controller 110 applies the negative voltage 150, the positive conducting layer 430 that the controller 110 applies the positive voltage 160, and an electrochromic film 440. The electrochromic filter configurations 400 and 450 share many similar features with the user interface display systems 100, 200, and 300; therefore, only the differences between the electrochromic filter configurations 400 and 450 and the user interface display systems 100, 200, and 300 are to be discussed in further detail.

The electrochromic filter 420 includes the negative conducting layer 410, the positive conducting layer 430, and the electrochromic film 440. The electrochromic film 440 includes electrochromic materials that are bi-stable in that when the controller 110 applies the positive voltage 160 to the positive conducting layer 430, the electrochromic film 440 transitions from an active state in that the electrochromic film 440 is in a color state to an inactive state in that the electrochromic film 440 is in a clear state. The electrochromic film 440 then transitions from the inactive state in that the electrochromic filter 430 is in the clear state to an active state in that the electrochromic filter 430 is in the color state when the controller 110 applies the negative voltage 150 to the negative conducting layer 410. In being bi-stable, the electrochromic film 440 may remain in its current state after the controller 110 applies the positive voltage 160 and/or the negative voltage 150 until the controller 110 applies a different voltage triggering the electrochromic film 440 to change from its current state.

For example, the electrochromic film 440 may remain inactive in the clear state in that the electrochromic filter 430 is clear thereby enabling the user interface display 140 to emit the color of the light source 130 until the controller 110 applies the negative voltage 150 to the negative conducting layer 410. The electrochromic film 440 may then activate and transition to the colored state when the controller 110 applies the positive voltage 160 to the positive conducting layer 430 thereby enabling the user interface display 140 to emit the color of the electrochromic film 160 when activated in the colored state until the controller 110 applies the positive voltage 160 to the positive conducting layer 430 and in doing so inactivating the electrochromic film 430 and transitioning the electrochromic film 430 back into the clear state.

The controller 110 may activate the electrochromic filter 420 and transition the electrochromic filter 420 into the colored state when the controller 110 applies the negative voltage 150 to the negative conducting layer 410. In applying the negative voltage 150 to the negative conducting layer 410, a discharge of the electrochromic filter 420 is triggered from the reduction oxidation of the electro potential between the cathode and the anode thereby activating the optical properties of the electrochromic film 430 to transition the electrochromic film 430 into the colored state such that the user interface display 140 emits the color of the electrochromic film 430. In applying the positive voltage 160 to the positive conducting layer 430, a charge of the electrochromic filter 420 is triggered from the reoxidation reaction of the electro potential between the cathode and the anode thereby deactivating the optical properties of the electrochromic film 430 to transition the electrochromic film 430 into the clear state such that the user interface display 140 emits the color of the light source 130.

In doing so, the electro potential of the electrochromic filter 420 may be triggered with a decreased voltage applied by the controller 110 whether the controller 110 applies the negative voltage 150 or the positive voltage 160 to the electrochromic filter 420. The electrochromic filter 420 may then activate into the colored state when the controller 110 applies a decreased negative voltage 150 and may remain in that state until a decreased positive voltage 160 is applied. The electrochromic filter 420 may then deactivate into the clear state when the controller 110 applies a decreased positive voltage 160 and may remain in that state until a decreased negative voltage 150 is applied. Thus, the electrochromic filter 420 may transition colors of the feedback pattern displayed by the user interface display 140 and may maintain the displayed color while consuming decreased power. In an embodiment, the electrochromic filter 420 may be activated into the colored state and may maintain the colored state or deactivated into the clear state and may maintain the clear state when the controller 110 applies the negative voltage 150 and/or the positive voltage 160 of 1V or less.

Embodiments of the User Interface Display System

FIG. 5 depicts an elevational view of an example electronic lock 500 that includes a first user interface display 510 that emits feedback patterns with a corresponding color based on a first electrochromic filter 120 that is associated with the first user interface display 510 and a second user interface display 520 that emits feedback patterns with a corresponding color based on a second electrochromic filter 120 that is associated with the second user interface display 520. The different user interface displays in 510 and 520 are each associated with different corresponding electrochromic filters 120 provide the electronic lock 500 with the flexibility to display several different feedback patterns along with the flexibility to display those different feedback patterns with different colors.

The first user interface display 510 may depict to the user a first plurality of feedback patterns. A first light source 130. A first light source 130 may emit a first plurality of light patterns via the first user interface display 510 to the user with each light pattern corresponding to each of the first plurality of feedback patterns that is displayed in response to the user engaging the electronic lock 500. A first electrochromic filter 120 that is associated with the first user interface display 510 and the first light source 130 is configured to transition between a first color and a second color for each of the first plurality of feedback patterns to correspond to the light pattern emitted by the first light source. Each of the first plurality of feedback patterns that is displayed to the user provides the corresponding first color or the second color that is associated with the feedback that is provided to the user as the user engages the electronic lock 500.

The first user interface display 510 being associated with a first light source 130 and a first electrochromic filter 120 enables the controller 110 to instruct the first user interface display 510 to display a first plurality of feedback patterns in that the first plurality of feedback patterns when displayed are appropriate to be displayed in the first color or the second color provided by the first electrochomic filter 120. The first plurality of feedback patterns may be feedback patterns that when displayed by the first user interface display 510 in the first color or the second color provided by the first electrochromic filter 120 provides additional feedback to the user as to the current status of the user engaging the electronic lock 510 as the user attempts to access the space regulated by the electronic lock 510. In doing so, the additional feedback provided to the user in the first color or the second color provided by the first electrochromic filter 120 when displayed with the corresponding feedback pattern may be well recognized by the user and may thereby successfully convey to the user the appropriate feedback relative to the status of the user currently engaging the electronic lock 500.

For example, the first user interface display 510 may include a first electrochromic filter 120 that when the controller 110 applies the negative voltage 150 to the first electrochromic filter 120, the first electrochromic filter 120 may transition from the inactive state to the active state and in doing so transition the color of the first electrochromic filter 120 from the first color of "clear" to the second color of "green". The first electrochromic filter 120 may then transition from the active state to the inactive state and in doing so transition the color of the first electrochromic filter 120 from the second color of "green" to the first color of "clear" when the controller 110 applies the positive voltage 160 to the first electrochromic filter 120.

The controller 110 may then instruct the first light source 130 to emit different light patterns such that the feedback pattern displayed by the first user interface display 510 displays feedback patterns that correspond to the either the first color of "clear" for the first electrochromic filter 120 or the second color of "green" for the first electrochromic filter 120. In doing so, the first light source 130 may include a screen printed OLED matrix of OLEDs in a color such that the color of the OLEDs when emitted with the first electrochromic filter 120 in the inactive state and thereby be the first color of "clear" may result in the first feedback display 510 emitting the corresponding feedback pattern with the color of the OLEDs.

For example, the first light source 130 may include OLEDs of the color which is the color "white". The controller 110 may then instruct the first light source 130 to emit the light pattern of "P" as shown in FIG. 3B when the user is attempting to program the electronic lock 500 to change the access code as the light pattern of "P" may result in a feedback pattern that is displayed by the first user interface display 510 of the feedback pattern of "P" that is emitted when the first electrochromic filter 120 is in the first color of "clear". In doing so, the feedback pattern of "P" that is emitted by the first user interface display 510 is displayed in the first color of "white" as that is the color of the OLEDs and the first electrochromic filter 120 is in the inactive state and is thereby in the first color of "clear" resulting in the feedback pattern of "P" being emitted as the first color of "white". The controller 110 may instruct the first light source 130 to emit the light pattern of "P" while applying the positive voltage 160 to the first electrochromic filter 120 to transition the first electrochromic filter 120 into the inactive state and thereby be the first color of "clear" in that the emitting the feedback pattern "P" in the color of the OLEDs of the first light source which is the color "white" is easily understood by the user that the user is currently successfully engaging the electronic lock 500 to program the electronic lock to change the access code.

Further in such an example, the controller 110 may then instruct the first light source 130 to emit the light pattern of the "check mark" as shown in FIG. 2 when the user is attempting to enter the access code into the electronic lock 500 with the request to transition the electronic lock 500 to the unlocked state as the light pattern of the "check mark" may result in a feedback pattern that is displayed by the first user interface display 510 of the feedback pattern of the "check mark" that is emitted when the first electrochromic filter 120 is in the second color of "green". In doing so, the feedback pattern of the "check mark" that is emitted by the first user interface display 510 is displayed in the second color of "green" as that is the color of the first electrochromic filter 120 in the active state and is thereby in the second color of "green" resulting in the feedback pattern of the "check mark" being emitted as the second color of "green". The controller 110 may instruct the first light source 130 to emit the light pattern of the "check mark" while applying the negative voltage 150 to the first electrochromic filter 120 to transition the second electrochromic filter 120 into the active state and thereby be the second color of "green" in that emitting the feedback pattern of the "check mark" in the second color of the first electrochromic filter 120 when in the active state which is the color "green" is easily understood by the user that the user is currently successful in entering the access code to transition the electronic lock 500 to the unlocked state.

The second user interface display 520 may depict to the user a second plurality of feedback patterns. A second light source 130 may emit a second plurality of light patterns via the second user interface display 520 to the user with each light pattern corresponding to each of the second plurality of feedback patterns that is displayed in response to the user engaging the electronic lock 500. A second electrochromic filter 120 that is associated with the second display 520 and the second light source 130 is configured to transition between a first color and a third color for each of the second plurality of feedback patterns to correspond to the light pattern emitted by the second light source 130. Each of the second plurality of feedback patterns that is displayed to the user provides the corresponding first color or the third color that is associated with the feedback that is provided to the user as the user engages the electronic lock 500.

The second display 520 being associated with a second light source 130 and a second electrochromic filter 120 enables the controller 110 to instruct the second display 510 to display a second plurality of feedback patterns in that the second plurality of feedback patterns when displayed are appropriate to be displayed in the first color or the third color provided by the second electrochomic filter 120. The second plurality of feedback patterns may be feedback patterns that when displayed by the second display 520 in the first color or the third color provided by the second electrochromic filter 120 provides additional feedback to the user as to the current status of the user engaging the electronic lock 500 as the user attempts to access the space regulated by the electronic lock 500. In doing so, the additional feedback provided to the user in the first color or the third color provided by the second electrochromic filter 120 when displayed with the corresponding feedback pattern may be well recognized by the user and may thereby successfully convey to the user the appropriate feedback relative to the status of the user currently engaging the electronic lock 500.

For example, the second display 520 may include a second electrochromic filter 120 that when the controller 110 applies the negative voltage 150 to the second electrochromic filter 120, the second electrochromic filter 120 may transition from the inactive state to the active state and in doing so transition the color of the second electrochromic filter 120 from the first color of "clear" to the third color of "red". The second electrochromic filter 120 may then transition from the active state to the inactive state and in doing so transition the color of the second electrochromic filter 120 from the second color of "red" to the first color of "clear" when the controller 110 applies the positive voltage 160 to the second electrochromic filter 120.

The controller 110 may then instruct the second light source 130 to emit different light patterns such that the feedback pattern displayed by the second display 520 displays feedback patterns that correspond to the either the first color of "clear" for the second electrochromic filter 120 or the second color of "red" for the second electrochromic filter 120. In doing so, the second light source 130 may include a screen printed OLED matrix of OLEDs in a color such that the color of the OLEDs when emitted with the second electrochromic filter 120 in the inactive state and thereby be the first color of "clear" may result in the second feedback display 520 emitting the corresponding feedback pattern with the color of the OLEDs.

For example, the second light source 130 may include OLEDs of the color which is the color "white". The controller 110 may then instruct the second light source 130 to emit the light pattern of "P" as shown in FIG. 3B when the user is attempting to program the electronic lock 500 to change the access code as the light pattern of "P" may result in a feedback pattern that is displayed by the second display 520 of the feedback pattern of "P" that is emitted when the second electrochromic filter 120 is in the first color of "clear". In doing so, the feedback pattern of "P" that is emitted by the second display 520 is displayed in the first color of "white" as that is the color of the OLEDs and the second electrochromic filter 120 is in the inactive state and is thereby in the first color of "clear" resulting in the feedback pattern of "P" being emitted as the first color of "white". The controller 110 may instruct the second light source 130 to emit the light pattern of "P" while applying the positive voltage 160 to the second electrochromic filter 120 to transition the second electrochromic filter 120 into the inactive state and thereby be the first color of "clear" in that the emitting the feedback pattern "P" in the color of the OLEDs of the second light source 130 which is the color "white" is easily understood by the user that the user is currently successfully engaging the electronic lock 500 to program the electronic lock 500 to change the access code.

Further in such an example, the controller 110 may then instruct the second light source 130 to emit the light pattern of the "X" as shown in FIG. 3A when the user is attempting to enter the access code into the electronic lock 500 with the request to transition the electronic lock 500 to the unlocked state as the light pattern of the "X" may result in a feedback pattern that is displayed by the second display 520 of the feedback pattern of the "X" that is emitted when the second electrochromic filter 120 is in the third color of "red". In doing so, the feedback pattern of the "X" that is emitted by the second display 520 is displayed in the third color of "red" as that is the color of the second electrochromic filter 120 in the active state and is thereby in the third color of "red" resulting in the feedback pattern of the "X" being emitted as the third color of "red". The controller 110 may instruct the second light source 130 to emit the light pattern of the "X" while applying the negative voltage 150 to the second electrochromic filter 120 to transition the second electrochromic filter 120 into the active state and thereby be the third color of "red" in that emitting the feedback pattern of the "X" in the third color of the second electrochromic filter 120 when in the active state which is the color "red" is easily understood by the user that the user is currently unsuccessful in entering the incorrect access code to transition the electronic lock 500 to the unlocked state.

Thus, the user interface display system 100 as depicted in the example electronic lock 500 provides the flexibility to display several different feedback patterns to the user such that each of the different feedback patterns may be displayed with the flexibility of different colors. The first user interface display 510 with the first light source 130 that has OLEDs in a first color and a first electrochromic filter 120 that transitions between the color of "clear" to the second color enables the controller 110 to display different feedback patterns via the first user interface display 510 that correspond to the first color of the OLEDs and the second color of the second electrochromic filter 120 when in the active state. The second user interface display 520 with the second light source 130 that has OLEDs in the first color and a second electrochromic filter 120 that transitions between the color of "clear" to the to the third color enables the controller to display different patterns via the second user interface display 510 that correspond to the first color of the OLEDs and the third color of the second electrochromic filter 120 when in the active state. In doing so, the controller 110 may have the flexibility to display several different feedback patterns that correspond to the different colors provided by the first light source 130 and the first electrochromic filter 120 of the first user interface display 510 and the second light source 130 and the second electrochromic filter 120 of the second user interface display 510 to further increase the effectiveness of the feedback provided to the user as the user engages the system associated with the user interface display system 100.

FIGS. 6A and 6B depict an elevational view of an example user interface display system 600, 650 that are associated with an electronic lock that emits feedback patterns with a corresponding color based on a first electrochromic filter 620 and a second electrochromic filter 660 that are both associated with a single user interface display 610 that emits feedback patterns with a corresponding color based on the first electrochromic filter 620 and the second electrochromic filter 660. The different feedback patterns that may be emitted by the single user interface display 610 associated with the different colors that may be provided by the first electrochromic filter 620 and the second electrochromic filter 660 provide the user interface display system 600, 650 that are associated with the electronic lock with the flexibility to display several different feedback patterns along with the flexibility to display those different feedback patterns with different colors.

The user interface display system 600, 650 include a single light source 630 that in this embodiment is a screen printed OLED flex circuit. The single light source 630 may emit the different light patterns as instructed by the controller 110 based on the current status of the user engaging the electronic lock. For example, the single light source 630 may emit the different light patterns that include but are not limited to the light pattern 640a of "OPEN" and the light pattern 640b of the "low battery indicator". The user interface display system 600, 650 also includes a single user interface display 610 such that the first electrochromic filter 620 and the second electrochromic filter 660 also included the user interface display system 600, 650 are associated with the single user interface display 610 rather than different user interface displays.

A first electrochromic filter 620 may transition between the first color when in the active state that transitions the feedback pattern displayed by the user interface display 610 to the first color and into the clear filter when in the inactive state that transitions the feedback pattern displayed by the user interface display 610 to the second color that is the color emitted by the light source 630. A second electrochromic filter 660 may transition between a third color when in the active state that transitions the feedback pattern displayed by the user interface display to the third color and into the clear filter when in the inactive state that transitions the feedback pattern displayed by the user interface display 610 to the second color that is color emitted by the light source.

The single user interface display 610 that is associated with the light source 130 and the first electrochromic filter 620 and the second electrochromic filter 660 enables the controller 110 to instruct the single user interface display 610 to display feedback patterns in that the feedback patterns when displayed are appropriate to be displayed in the first color provided by the first electrochromic filter 620 and/or the third color provided by the second electrochromic filter 660 and/or the second color which is the color of the light source 630 when both the first electrochromic filter 620 and the second electrochromic filters 660 are in inactive and thereby in the color of "clear". The feedback patterns when displayed by the single user interface display 610 in the first color of the first electrochromic filter 620 and/or the third color of the second electrochromic filter 660 and/or the second color of the light source 630 provides additional feedback to the user as to the current status of the user engaging the electronic lock associated with the user interface display system 600, 650 as the user attempts to access the space regulated by the electronic lock. In doing so, the additional feedback provided to the user in the first color provided by the first electrochromic filter 620 and/or the third color provided by the second electrochromic filter 660 and/or the second color of the light source 630 when displayed with the corresponding feedback pattern may be well recognized by the user and may thereby successfully convey to the user the appropriate feedback relative to the status of the user currently engaging the electronic lock associated with the user interface display system 600, 650.

For example, the single user interface display 610 may include the first electrochromic filter 620 that when the controller 110 applies the negative voltage 150 to the first electrochromic filter 620, the first electrochromic filter 620 may transition from the inactive state to the active state and in doing so transition the color of the first electrochromic filter 620 from the color of "clear" to the first color of "blue". The controller 110 may then apply the positive voltage 160 to the second electrochromic filter 660 and may transition the second electrochromic filter 660 from the active state to the inactive state and in doing so transition the color of the second electrochromic filter 660 form the third color of "red" to the color of "clear". In doing so, the single user interface display may emit feedback patterns that are displayed with the first color of "blue" which is the color of the first electrochromic filter 620 when in the active state with the second electrochromic filter 660 being the color of "clear" when in the inactive state.

The controller 110 may then instruct the light source 630 to emit different light patterns such that the feedback pattern displayed by the single user interface display 610 displays feedback patterns that correspond to first color of "blue". The controller 110 may then instruct the light source 630 to emit the light pattern of "OPEN" as shown in FIG. 6A when the user has successfully transitioned the electronic lock to the unlocked state such that the electronic lock is now "OPEN" allowing the user to enter the space that is regulated by the electronic lock and may result in a feedback pattern that is displayed by the single user interface display 610 of the feedback pattern of "OPEN" in the first color of "blue". In doing so, the feedback pattern of "OPEN" that is emitted by the single user interface display 610 is displayed in the first color of "blue" as that is the color of the first electrochromic filter 620 when in the active state and the second electrochromic filter 660 is the color of "clear" when in the inactive state.

Further in such an example, the controller 110 may then apply the positive voltage 160 to the first electrochromic filter 620 such that the first electrochromic filter 620 may transition from the active state to the inactive state and in doing so transition from the color of the first electrochromic filter 620 of the first color of "blue" to the color of "clear". The controller may then apply the negative voltage 150 to the second electrochromic filter 660 and may transition the second electrochromic filter 660 from the inactive state to the active state and in doing so transition the color of the second electrochromic filter 660 from the color of "clear" to the third color of "red". In doing so, the single user interface display 610 may emit feedback patterns that are displayed in the third color of "red" which is the color of the second electrochromic filter 620 when in the inactive state with the first electrochromic filter 620 being the color of "clear" when in the active state.

The controller 110 may then instruct the light source 630 to emit different light patterns such that the feedback pattern displayed by the single user interface display 610 displays feedback patterns that correspond to the third color of "red". The controller 110 may then instruct the light source 630 to emit the light pattern of "low battery" as shown in FIG. 6B when the power level of the battery associated with the electronic lock has decreased below a threshold indicating that a new battery is requires to increase the power level of the battery and may result in a feedback pattern that is displayed by the single user interface display 610 of the feedback pattern of "low battery" in the third color of "red". In doing so, the feedback pattern of "low battery" that is emitted by the single user interface display 610 is displayed in the third color of "red" as that is the color of the second electrochromic filter 660 when in the active state and the first electrochromic filter 620 is the color of "clear" when in the active state.

Further in such an example, the controller 110 may then apply the positive voltage 160 to the first electrochromic filter 620 such that the first electrochromic filter 620 may maintain the inactive state and in doing so maintain the color of "clear". The controller 110 may then apply the positive voltage 160 to the second electrochromic filter 660 and may transition the second electrochromic filter 660 from the active state to the inactive state and in doing so transition the color of the second electrochromic filter 660 from the third color of "red" to the color of "clear". In doing, so the single user interface display 610 may emit feedback patterns that are displayed in the second color which is the color of the light source 630. The controller 110 may then instruct the light source 630 to emit different light patterns such that the feedback pattern displayed by the single user interface display 610 displays feedback patterns that correspond to the second color which is the color of the screen printed OLED matrix of OLEDs in a color such that the color of the OLEDs when emitted with the first electrochromic filter 620 and the second electrochromic filter 660 in the inactive state and thereby both being the color of "clear" may result in the single feedback display 610 emitting the corresponding feedback pattern with the color of the OLEDs.

Further in such an example, the controller 110 may then apply the negative voltage 150 to the first electrochromic filter 620 such that the first electrochromic filter 620 may transition from the inactive state to the active state and in doing so transition to the first color of "blue". The controller 110 may then apply the negative voltage 150 to the second electrochromic filter 660 and may transition the second electrochromic filter 660 from the inactive state to the active state and in doing so transition the color of the second electrochromic filter 660 to the third color of "red". In doing so, the single user interface display 610 may emit feedback patterns that are displayed in a combination of the first color of "blue" and the third color of "red" generating a fourth color of "purple" such that the single user interface display 610 may emit feedback patterns of the fourth color of "purple." The controller 110 may then instruct the light source 630 to emit different light patterns such that the feedback pattern displayed by the single user interface display 610 displays feedback patterns that correspond to the fourth color of "purple" which is the combination of the first color of the first electrochromic filter 620 of the color of "blue" and the third color of the second electrochromic filter 660 of the color of "red" when in the active states that may result in the single feedback display 610 emitting the corresponding feedback pattern with the fourth color of "purple".

Thus, the user interface display system 600, 650 as associated with the electronic lock provides the flexibility to display several different feedback patterns to the user such that each of the different feedback patterns may be displayed with the flexibility of different colors. The single user interface display 610 with the light source 130 that has OLEDs in a second color and a first electrochromic filter 620 that transitions between the color of "clear" to the first color as well as a second electrochromic filter 660 that transitions between the color of "clear" to the third color enables the controller 110 to display different feedback patterns via the single user interface display 610 that corresponds to the second color of the OLEDs, the first color of the first electrochromic filter 620, the third color of the electrochromic filter 660 and any combination thereof of the first color, the second color, and/or the third color. In doing so, the controller 110 may have the flexibility to display several different feedback patterns that correspond to the different colors provided by the light source 630, the first electrochromic filter 620, the second electrochromic filter 660 and/or any combination thereof to further increase the effectiveness of the feedback provided to the user as the user engages the system associated with the user interface display system 600, 650.

The user interface display system 600, 650 may include any number of electrochromic filters that may be associated with the single user interface display 610 and the light source 630 and the controller 110 may transition any number of the electrochromic filters between the active state and/or inactive state to generate feedback patterns that are displayed in any type of color that will be apparent to those skilled in the relevant art(s) without departing from the spirit and scope of the disclosure. The electrochromic filters 120 may transition into any type of color when in the active state that will be apparent to those skilled in the relevant art(s) without departing from the spirit and scope of the disclosure. The light source 130 may include OLEDs that may emit any type of color that will be apparent to those skilled in the relevant art(s) without departing from the spirit and scope of the disclosure The light source 130 and the user interface display 140 may emit any type of feedback pattern that may provide feedback to the user as to the current status of the user engaging the system associated with the user interface display system 100 that will be apparent to those skilled in the relevant art(s) without departing from the spirit and scope of the disclosure. The controller 110 may instruct the user interface display 140 to emit any feedback pattern in any corresponding color based on the colors of the electrochromic filters 120 when in the active state and the color of the OLEDs of the light source 130 that will be apparent to those skilled in the relevant art(s) without departing from the spirit and scope of the disclosure.

Access Control Device System Overview

FIG. 7 is a block diagram of an exemplary access control device configuration 700 that incorporates the user interface display systems discussed in detail above. For example, the access control device configuration 700 may incorporate the user interface display system 100 into the user interface display system 720 which operates as the controller for the access control device 710. In doing so, the user interface display system 720 as operating as the controller of the access control device 710 may control one or more components of the access control device 710 as the access control device 710 operates. For example, the access control device 710 may be a locking system and the user interface display system 720 determines when the door latch of the locking mechanism included in the access control device 710 is to extend when the access control device 710 is to be locked and when the door latch is to retract when the access control device 710 is to be unlocked.

The access control device 710 that the user interface display system 720 may act as the controller for may include but is not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control device that regulates access control to a space that will be apparent to those skilled in the relevant art(s) without departing from the spirit and scope of the disclosure.

The user interface display system 720 when operating as the controller for the access control device 710 may control one or more components of the access control device 710 as the access control device 710 operates such as but not limited to, extending/retracting a door latch, engaging/disengaging a dogging mechanism on an exit device, opening/closing a door via a door closer/operator, moving a primer mover, controlling an electric motor, and/or any other type of action that enables the access control device 710 to regulate the opening and/or closing of a door that provides access to a space that will be apparent to those skilled in the relevant art(s) without departing from the spirit and scope of the disclosure.

The user interface display system 720 when operating as the controller for the access control device 710 may receive data from the access control device 710 as well any type of component included in the access control device 710 that may provide data to the user interface display system 720 for the user interface display system 720 to adequately instruct the access control device 710 as to how to operate to adequately regulate how the door opens and/or closes to provide access to the space.

For example, sensors included in a locking mechanism may send data to the user interface display system 720 indicating that a person has departed from the door after the door closed behind the person. The user interface display system 720 may then instruct the door latch to extend thereby locking the door. The user interface display system 720 may receive data from any type of component included in the access control device 710 that includes but is not limited to sensors, credential readers, biometric sensing devices, user interface devices, and/or any other component that may provide data to the user interface display system 720 to adequately instruct the access control device 910 to execute actions to regulate door closer to the space that will be apparent to those skilled in the relevant art(s) without departing from the spirit and scope of the disclosure.

The user interface display system 720 may communicate to with the access control device 910 via wire-line communication and/or wireless communication. The user interface display system 720 may engage in wireless communication with the access control device 710 that includes but is not limited to Bluetooth, BLE, Wi-Fi, and/or any other wireless communication protocol that will be apparent to those skilled in the relevant art(s) without departing from the spirit and scope of the disclosure. The user interface display system 720 may communicate with the server 740 via network 730.

System Overview

Referring now to FIG. 8, a simplified block diagram of at least one embodiment of a computing device 800 is shown. The illustrative computing device 800 depicts at least one embodiment of a controller 110 for the user interface display system 100 illustrated in FIG. 1. Depending on the particular embodiment, computing device 800 may be embodied as a reader device, credential device, door control device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 800 includes a processing device 802 that executes algorithms and/or processes data in accordance with operating logic 808, an input/output device 804 that enables communication between the computing device 800 and one or more external devices 810, and memory 806 which stores, for example, data received from the external device 810 via the input/output device 804.

The input/output device 804 allows the computing device 800 to communicate with the external device 810. For example, the input/output device 804 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 800. The input/output device 804 may include hardware, software, and/or firmware suitable for performing the techniques described herein.

The external device 810 may be any type of device that allows data to be inputted or outputted from the computing device 800. For example, in various embodiments, the external device 810 may be embodied as controller 110 in the user interface display system 100. Further, in some embodiments, the external device 810 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 810 may be integrated into the computing device 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrative embodiment, the processing device 802 is of a programmable variety that executes algorithms and/or processes data in accordance with operating logic 808 as defined by programming instructions (such as software or firmware) stored in memory 806. Additionally or alternatively, the operating logic 808 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable variety, such as a disk, tape, memory stick, cartridge, and/or other suitable portable memory. In operation, the memory 806 may store various data and software used during operation of the computing device 800 such as operating systems, applications, programs, libraries, and drivers. It should be appreciated that the memory 806 may store data that is manipulated by the operating logic 808 of processing device 802, such as, for example, data representative of signals received from and/or sent to the input/output device 804 in addition to or in lieu of storing programming instructions defining operating logic 808. As shown in FIG. 8, the memory 806 may be included with the processing device 802 and/or coupled to the processing device 802 depending on the particular embodiment. For example, in some embodiments, the processing device 802, the memory 806, and/or other components of the computing device 800 may form a portion of a system-on-a-chip (SoC) and be incorporated on a single integrated circuit chip.

In some embodiments, various components of the computing device 800 (e.g., the processing device 802 and the memory 806) may be communicatively coupled via an input/output subsystem, which may be embodied as circuitry and/or components to facilitate input/output operations with the processing device 802, the memory 806, and other components of the computing device 800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 800 may include other or additional components, such as those commonly found in a typical computing device (e.g., various input/output devices and/or other components), in other embodiments. It should be further appreciated that one or more of the components of the computing device 800 described herein may be distributed across multiple computing devices. In other words, the techniques described herein may be employed by a computing system that includes one or more computing devices. Additionally, although only a single processing device 802, I/O device 804, and memory 806 are illustratively shown in FIG. 8, it should be appreciated that a particular computing device 800 may include multiple processing devices 802, I/O devices 804, and/or memories 806 in other embodiments. Further, in some embodiments, more than one external device 810 may be in communication with the computing device 800.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has not been described above with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships are appropriately performed.

It will be apparent to those skilled in the relevant art(s) that various changes in form and in detail can be made without departing from the spirit and scope of the present disclosure. Thus the present disclosure should not be limited by any of the above-described exemplary embodiments, but should be defined only in accordance with the following claims and their equivalents.

What is claimed is:

1. A user interface display system that is associated with an electronic lock that provides feedback to a user that is engaging the electronic lock, comprising:
   a user interface display configured to depict to the user a plurality of feedback patterns with each feedback pattern that is displayed is in response to the user engaging the electronic lock, wherein each feedback pattern that is displayed to the user provides the feedback to the user as the user engages the electronic lock;
   an electrochromic filter configured to transition a color depicted by the user interface display to correspond to the feedback pattern depicted by the user interface display, wherein each feedback pattern that is displayed to the user provides a corresponding color that is associated with the feedback that is provided to the user as the user engages the electronic lock; and
   a controller configured to transition the electrochromic filter to each color to correspond with the feedback pattern that is depicted by the user interface display so that the transitioned color and the feedback pattern that is displayed is in response to the user engaging the electronic lock.

2. The user interface display system of claim 1, further comprising:
   a light source configured to emit a plurality of light patterns via the user interface display to the user with each light pattern corresponding to each feedback pattern that is displayed in response to the user engaging the electronic lock.

3. The user interface display system of claim 2, wherein the controller is further configured to instruct the light source to emit each light pattern via the user interface display to the user that corresponds to each feedback pattern that is displayed in response to the user engaging the electronic lock.

4. The user interface display system of claim 3, wherein the electrochromic filter is further configured to transition the color of the feedback pattern displayed by the user interface display to correspond to the light pattern emitted by the light source.

5. The user interface display system of claim 4, wherein the controller is further configured to transition the electrochromic filter to each color to correspond with the light pattern that is emitted by the light source so that the transitioned color and the emitted light pattern that is displayed is in response to the user engaging the electronic lock.

6. The user interface display system of claim 5, further comprising:
   a first user interface display that is configured to depict to the user a first plurality of feedback patterns;
   a first light source configured to emit a first plurality of light patterns via the first user interface display to the user with each light pattern corresponding to each of the first plurality of feedback patterns that is displayed in response to the user engaging the electronic lock;
   a first electrochromic filter that is associated with the first display and the first light source and is configured to transition between a first color and a second color for each of the first plurality of feedback patterns to correspond to the light pattern emitted by the first light source, wherein each of the first plurality of feedback patterns that is displayed to the user provides the corresponding first color or the second color that is associated with the feedback that is provided to the user as the user engages the electronic lock;
   a second user interface display that is configured to depict to the user a second plurality of feedback patterns;
   a second light source configured to emit a second plurality of light patterns via the second user interface display to the user with each light pattern corresponding to each of the second plurality of feedback patterns that is displayed in response to the user engaging the electronic lock;
   a second electrochromic filter that is associated with the second display and the second light source and is configured to transition between the first color and a third color for each of the second plurality of feedback patterns to correspond to the light pattern emitted by the second light source, wherein each of the second plurality of feedback patterns that is displayed to the user provides the corresponding first color or the third color that is associated with the feedback that is provided to the user as the user engages the electronic lock.

7. The user interface display system of claim 6, wherein the controller is further configured to:
   instruct the first light source to emit each light pattern from the first plurality of light patterns via the first user interface display to the user with each light pattern corresponding to each of the first plurality of feedback patterns that is displayed in response to the user engaging the lock;
   transition the first electrochromic filter that is associated with the first display and the first light source to transition between the first color and the second color to correspond with the light pattern that is emitted by the first light source so that the transitioned first color or second color and the emitted light pattern that is displayed via the first user interface display is in response to the user engaging the electronic lock;
   instruct the second light source to emit each light pattern from the second plurality of light patterns via the second user interface display to the user with each light pattern corresponding to each of the second plurality of feedback patterns that is displayed in response to the user engaging the lock; and
   transition the second electrochromic filter that is associated with the second display and the second light source to transition between the first color and the third color to correspond with the light pattern that is emitted by the second light source so that the transitioned first color or third color and the emitted light pattern that is displayed via the second user interface display is in response to the user engaging the electronic lock.

8. A method for providing feedback to a user that is engaging an electronic lock, comprising:
   depicting to the user a plurality of feedback patterns via a user interface display with each feedback pattern that is displayed is in response to the user engaging the electronic lock, wherein each feedback pattern that is displayed to the user provides the feedback to the user as the user engages the electronic lock;
   transitioning a color depicted by the user interface display via an electrochromic filter to correspond to the feedback pattern depicted by the user interface display, wherein each feedback pattern that is displayed to the user provides a corresponding color that is associated with the feedback that is provided to the user as the user engages the electronic lock; and
   transitioning the electrochromic filter to each color via a controller to correspond with the feedback pattern that is depicted by the user interface display so that the transitioned color and the feedback pattern that is displayed is in response to the user engaging the electronic lock.

9. The method of claim 8, further comprising:
emitting a plurality of light patterns by a light source that is emitted via the user interface display to the user with each light pattern corresponding to each feedback pattern that is displayed in response to the user engaging the electronic lock.

10. The method of claim 9, further comprising:
instructing the light source via the controller to emit each light pattern via the user interface display to the user that corresponds to each feedback pattern that is displayed in response to the user engaging the electronic lock.

11. The method of claim 10, further comprising:
transitioning via the electrochromic filter the color of the feedback pattern displayed by the user interface display to correspond to the light pattern emitted by the light source.

12. The method of claim 11, wherein the transitioning comprises:
transitioning the electrochromic filter via the controller to each color to correspond with the light pattern that is emitted by the light source so that the transitioned color and the emitted light pattern that is displayed is in response to the user engaging the electronic lock.

13. The method of claim 12, further comprising:
depicting to the user via a first user interface display a first plurality of feedback patterns;
emitting by a first light source a first plurality of light patterns via the first user interface display to the user with each light pattern corresponding to each of the first plurality of feedback patterns that is displayed in response to the user engaging the electronic lock;
transitioning via a first electrochromic filter that is associated with the first user interface display and the first light source between a first color and a second color for each of the first plurality of feedback patterns to correspond to the light pattern emitted by the first light source, wherein each of the first plurality of feedback patterns that is displayed to the user provides the corresponding first color or the second color that is associated with the feedback that is provided to the user as the user engages the electronic lock;
depicting to the user via a second visual a second plurality of feedback patterns;
emitting by a second light source a second plurality of light patterns via the second user interface display to the user with each light pattern corresponding to each of the second plurality of feedback patterns that is displayed in response to the user engaging the electronic lock; and
transitioning via a second electrochromic filter that is associated with the second display and the second light source between the first color and a third color for each of the second plurality of feedback patterns to correspond to the light pattern emitted by the second light source, wherein each of the second plurality of feedback patterns that is displayed to the user provides the corresponding first color or the third color that is associated with the feedback that is provided to the user as the user engages the electronic lock.

14. The method of claim 13, further comprising:
instructing the first light source to emit each light pattern from the first plurality of light patterns via the first user interface display to the user with each light pattern corresponding to each of the first plurality of feedback patterns that is displayed in response to the user engaging the lock;
transitioning the first electrochromic filter that is associated with the first display and the first light source to transition between the first color and the second color to correspond with the light pattern that is emitted by the first light source so that the transitioned first color or second color and the emitted light pattern that is displayed via the first user interface display is in response to the user engaging the electronic lock;
instructing the second light source to emit each light pattern from the second plurality of light patterns via the second user interface display to the user with each light pattern corresponding to each of the second plurality of feedback patterns that is displayed in response to the user engaging the electronic lock; and
transitioning the second electrochromic filter that is associated with second display and the second light source to transition between the first color and the third color to correspond with the light pattern that is emitted by the second light source so that the transitioned first color or third color and the emitted light pattern that is displayed via the second user interface display is in response to the user engaging the electronic lock.

15. A user interface display system that that provides feedback to a user that is engaging the user interface display system, comprising:
a user interface display configured to depict to the user a plurality of feedback patterns with each feedback pattern that is displayed is in response to the user engaging the user interface display system, wherein each feedback pattern that is displayed to the user provides the feedback to the user as the user engages the user interface display system;
a light source configured to emit a plurality of light patterns via the user interface display to the user with each light pattern corresponding to each feedback pattern that is displayed in response to the user engaging the user interface display system;
an electrochromic filter configured to transition a color of the feedback pattern displayed by the user interface display to correspond to the light pattern emitted by the light source, wherein each feedback pattern that is displayed to the user provides a corresponding color that is associated with the feedback that is provided to the user as the user engages the electronic lock;
a controller configured to:
instruct the light source to emit each light pattern via the user interface display to the user that corresponds to each feedback pattern that is displayed in response to the user engaging the user interface display system, and
transition the electrochromic filter to each color to correspond with the light pattern that is emitted by the light source so that the transitioned color and the emitted light pattern that is displayed is in response to the user engaging the user interface display system.

16. The user interface display system of claim 15, wherein the electrochromic filter is further configured to:
transition from an inactive state to an active state that activates the electrochromic filter into a first color that transitions the feedback pattern displayed by the user interface display to the first color that corresponds to the light pattern emitted by the light source; and transition from the active state to the inactive state that deactivates the electrochromic filter into a clear filter that transitions the feedback pattern displayed by the user interface display to a second color to the light pattern emitted by the light source, wherein the second color is a color that is emitted by the light source.

17. The user interface display system of claim 16, wherein the controller is further configured to:
  activate the electrochromic filter to transition the electrochromic filter from the inactive state to the active state that activates the electrochromic filter into the first color that transitions the feedback pattern displayed by the user interface display to the first color that corresponds to the light pattern emitted by the light source; and
  deactivate the electrochromic filter to transition the electrochromic filter from the active state to the inactive state that deactivates the electrochromic filter into the clear filter that transitions the feedback pattern displayed by the user interface display to the second color that is the color emitted by the light source.

18. The user interface display system of claim 17, further comprising:
  a first electrochromic filter configured to transition between the first color when in the active state that transitions the feedback pattern displayed by the user interface display to the first color and into the clear filter when in the inactive state that transitions the feedback pattern displayed by the user interface display to the second color that is the color emitted by the light source; and
  a second electrochromic filter configured to transition between a third color when in the active state that transitions the feedback pattern displayed by the user interface display to the third color and into the clear filter when in the inactive state that transitions the feedback pattern displayed by the user interface display to the second color that is the color emitted by the light source.

19. The user interface display system of claim 18, wherein the controller is further configured to:
  deactivate the second electrochromic filter to transition the second electrochromic filter from the active state to the inactive state that deactivates the second electrochromic filter into the clear filter; and
  activate the first electrochromic filter to transition the first electrochromic filter from the inactive state to the active state that activates the first electrochromic filter into the first color that transitions the feedback pattern displayed by the user interface display to the first color due to the second electrochromic filter being deactivated into the clear filter and the first electrochromic filter being activated into the first color.

20. The user interface display system of claim 19, wherein the controller is further configured to:
  deactivate the first electrochromic filter to transition the first electrochromic filter from the active state to the inactive state that deactivates the first electrochromic filter into the clear filter; and
  activate the second electrochromic filter to transition the second electrochromic filter from the inactive state to the active state that activates the second electrochromic filter into the third color that transitions the feedback pattern displayed by the user interface display to the third color due to the first electrochromic filter being deactivated into the clear filter and the second electrochromic filter being activated into the third color.

* * * * *